D. STUMP.
FASTENER FOR TRACTION CHAINS.
APPLICATION FILED OCT. 20, 1919.
1,330,357.
Patented Feb. 10, 1920.
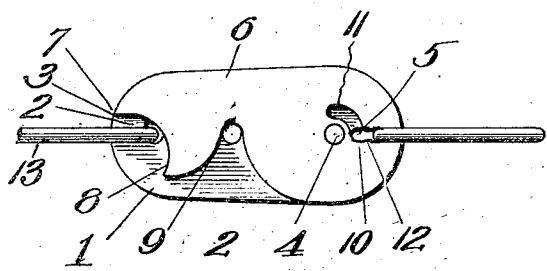
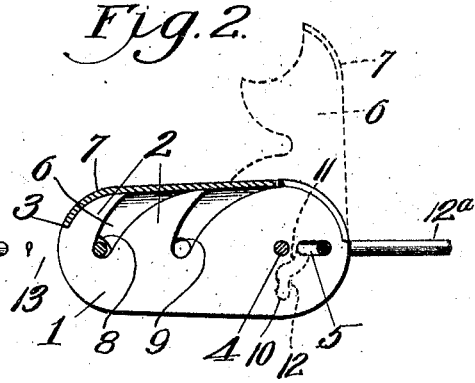
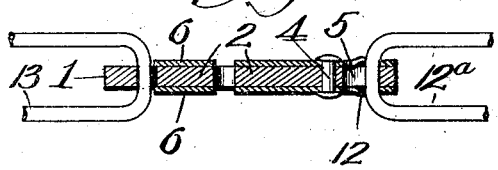
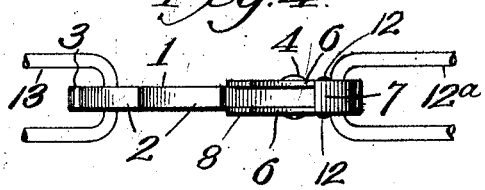
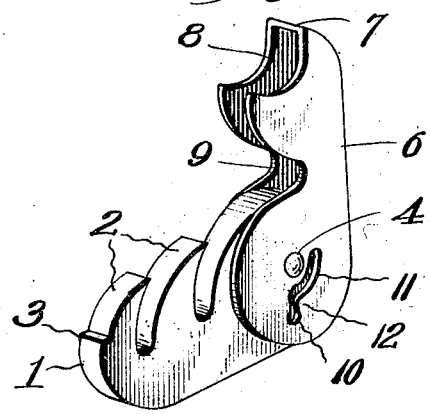
WITNESS:
INVENTOR.
David Stump.
BY
*ATTORNEY.*

UNITED STATES PATENT OFFICE.

DAVID STUMP, OF BLUE MOUND, KANSAS.

FASTENER FOR TRACTION-CHAINS.

1,330,357.  Specification of Letters Patent.  Patented Feb. 10, 1920.

Application filed October 20, 1919. Serial No. 331,984.

*To all whom it may concern:*

Be it known that I, DAVID STUMP, a citizen of the United States, residing at Blue Mound, in the county of Linn and State of Kansas, have invented certain new and useful Improvements in Fasteners for Traction-Chains, of which the following is a specification.

This invention relates to fasteners for traction chains for pneumatic tired wheels, and more especially to chains of that class comprising two circumferential members connected by cross members at suitable intervals and provided at their ends with snap fasteners, and my object is to produce fasteners by which the ends of the circumferential members of such chains can be secured together with less danger of opening accidentally and more readily and easily opened by hand when the necessity therefor arises.

More specifically my object is to produce a chain fastener comprising two members so constructed and related that the pull of the chain tends to maintain the members in closed relation; said members being also so constructed as to prevent mud and pieces of rock or other hard substances tending to open the members.

With the object mentioned in view, the invention consists in certain novel and useful features of invention and combinations of parts as hereinafter described and claimed; and in order that it may be fully understood, reference is to be had to the accompanying drawing, in which:

Figure 1, is a side elevation of a chain fastener embodying the invention and in locked relation to a chain.

Fig. 2, is a vertical section of the same, with the locking member occupying its open or inoperative position, in dotted lines.

Fig. 3, is a central horizontal section of the fastener.

Fig. 4, is a plan or top edge view of the fastener in open position.

Fig. 5, is a perspective view of the fastener in open position.

In the said drawing, 1 indicates the inner or hook member of the device, the same being of uniform thickness and of substantially elliptic form in side view and slotted in its upper edge to form one or more upwardly projecting hooks 2, the front walls of which overhang their inner ends. The rounded front end of the member 1 is preferably recessed to form an upwardly facing shoulder 3, and in the longitudinal plane of the inner ends of the hooks and preferably eccentrically thereof a pivot 4 extends through the member, said pivot being axial with respect to the rear curved edge of the members, and in the longitudinal plane of the inner ends of said hooks and said pivot 4, and rearward of the latter said member is provided with a short longitudinal slot 5.

The locking member of the fastener comprises a pair of parallel sides 6 for receiving the member 1 snugly between them and pivoted on pivot 4, the upper edges of the sides being connected by a top 7 for normally closing the open ends or mouths of the spaces between the hooks 2, and curving downwardly at its front end to fit against the shoulder 3 and form a continuation of the curved front end of member 1, this arrangement guarding against stones or other objects along a roadway slipping between the free ends of the members and tending to pry them apart. It also guards against mud wedging between said free ends and hardening and thus making imperative its removal before the members can be properly closed upon the ensuing use of the chains. The lower edges of the sides are serrated or recessed as at 8 and 9 so as to leave uncovered the closed ends of the spaces between the hooks 2 when the locking member is closed. The sides of the locking member are provided with short longitudinal slots 10 normally registering with slots 5, and communicating slots 11 concentric of the pivot 4, to prevent or minimize the chance of an object accidentally sliding in slots 5 and 10 from end to end thereof, the slots 10 are constricted in width between their ends by resilient lips 12.

Of a chain of which this fastener forms a part, 12ª indicates one end link, and the same extends slidingly through slot 5 and is permanently attached to said member and also to the locking member 6, though the slot 10 or slot 11 of the locking member may engage said link. Normally the link engages slot 10, especially when the chain is under tension, and in such condition the pull of the chain in the outer ends of slots 5 and 10 makes it impossible for the locking member to swing open, it being noted in this connection, that before the said member can be swung open, it is necessary to force the engaged end of the link 12ª past the resilient lips 12 to the inner ends of the slots 5 and 10. While the fastener and link are held in such position, the locking member can be swung open, as the arcuate slot 11 permits of such adjustment of said locking member. While the locking member is open the link 13 at or near the opposite end of the chain can be engaged with the proper hook 2, there being more than one hook in order to provide for different adjustments to suit or accommodate tires which may vary somewhat in size, and after the link 13 is engaged with one of said hooks 2, the locking member is swung down to locking position, and then the link 12ª and catch are pulled in opposite directions to cause the engaged end of said link to press the lips 12 apart and permit the closed end of the link to engage the outer ends of the registering slots 5 and 10.

It will be apparent that with a fastener of this type, tension on the chain will tend to hold the locking member in closed position regardless of the presence or absence of the resilient lips, as even should the link 12ª slide forward in slots 5 and 10, it would be necessary at the same instant for the locking member 6 to swing upward in order to result in accidental disengagement of link 13 with the engaged hook 2. The probability of synchronous approaching movement of link 12ª and the locking device, and the upward swinging movement of the locking member of the latter is improbable, but to make the fastener even more effective, these actions are guarded against by the use of the resilient lips 12. By providing the member 1 with the shoulder 3 and fitting the locking member upon said shoulder so that the front end of the former shall be flush with the corresponding end of member 1, a chance for mud and other foreign matter to wedge between the free ends of the members is prevented or minimized.

From the above description it will be apparent that I have produced a device of the character described possessing all of the advantages set forth, and while I have described and claimed the preferred embodiment of the same I reserve the right to all changes properly falling within the spirit and scope of the appended claims and the principle of construction involved.

I claim:

1. A fastener, comprising a member provided with a hook and a longitudinal slot, a second member pivoted to the first at a point between said hook and slot and adapted for closing the mouth of said hook; said second member having a longitudinal slot normally registering with the longitudinal slot of the first member, and a slot concentric of said pivot and communicating with the inner end of the longitudinal slot.

2. A fastener, comprising a member provided with a hook and a longitudinal slot, a second member pivoted to the first at a point between said hook and slot and adapted for closing the mouth of said hook; said second member having a longitudinal slot normally registering with the longitudinal slot of the first member, and a slot concentric of said pivot and communicating with the inner end of the longitudinal slot, the said longitudinal slot of one of said members being constricted between its ends by a resilient lip.

3. A fastener, comprising an elliptic member provided at its upper edge with a pair of rearwardly opening hooks and with a recess at its front end, and also provided with a longitudinal slot near its rear end, and a pivot in line with and between said slot and the closed end of said hooks, and a locking member comprising a pair of sides fitting snugly against opposite sides of the first-named member, and a top fitting upon the upper edge of the first-named member and closing the mouths of said hooks and also fitting at its front end against the said shoulder; said locking member having the lower edges of its side walls serrated to expose the closed or longitudinal ends of the hooks, the side walls also having longitudinal slots normally registering with the slot in the first-named member, and arcuate slots communicating with the inner ends of said longitudinal slots.

In testimony whereof I affix my signature.

DAVID STUMP.